United States Patent Office 3,562,749
Patented Feb. 9, 1971

3,562,749
DETECTION SYSTEM USING OSCILLATION WAVES
Tsukushi Uchimoto, 6–30–7 Shimouma, Setagaya-ku, and Shoji Sayama, 1–4–28–216 Aza-Uenohara, Kurume-machi, Kitatama-gun, both of Tokyo-to, Japan
Filed Nov. 19, 1968, Ser. No. 776,870
Claims priority, application Japan, Nov. 20, 1967, 42/74,262
Int. Cl. G01s 9/02
U.S. Cl. 343—7.5
3 Claims

ABSTRACT OF THE DISCLOSURE

A detection system for detecting an object or objects in response to the change of condition in the paths of oscillation waves; where a plurality of devices, each comprising a frequency converter, and a receiving means and a sending means respectively connected to the input and output of the frequency converter, configuration consisting of one of the devices, the path over which the devices oscillation wave travels to the second device, the second device, and the path over which the second device's oscillation wave travels to the first device. The oscillation waves of the two devices are of different frequencies, and the loop circuit is tuned to an oscillation condition when a predetermined condition is met at each of the transmission paths. An object or objects can be detected whether or not the oscillation condition exists in the loop circuit.

---

This invention relates to the detection of an object or objects and more particularly to detection systems for detecting an object or objects in response to the change of condition in the paths of oscillation waves.

Heretofore there have been proposed many kinds of detection systems using an oscillation wave. In one such system, an ultrasonic signal is generated by means of an electro-ultrasonic (sending) transducer and propagated in space. The propagated ultrasonic waves are received by an ultrasonic-electric (receiving) transducer disposed opposite the sending transducer. In this system, if an object intersects the ultrasonic beam propagating from the sending to the receiving transducers, the object can be detected by monitoring the level of the ultrasonic wave received by the receiving transducer and a receiving device connected to the receiving transducer. However, this system needs an oscillator of the ultrasonic signal and the receiving device, and the change of condition of the path from the sending to the receiving transducers can be detected at the receiving side only.

Another detection system using an ultrasonic wave has been disclosed in U.S. Pat. No. 3,065,455. In this conventional detection system, there is provided an ultrasonic-electric (receiving) transducer, an amplifier connected to the receiving transducer, and an electro-ultrasonic (sending) transducer connected to the output of the amplifier and disposed opposite the receiving transducer, so that an ultrasonic loop circuit is formed by the receiving transducer, the amplifier, the sending transducer and the ultrasonic path between the two transducers. Accordingly, if the loop gain and the phase characteristic of the ultrasonic loop circuit are preset at an appropriate value so as to generate an ultrasonic oscillation in the loop circuit, objects intersecting the ultrasonic path can be detected by monitoring the attenuation of the ultrasonic oscillation. In this system, connection lines between the receiving transducer and the sending transducer are required, while an ultrasonic oscillator and receiver are not necessary. Accordingly, if it is impossible to dispose of the above-mentioned connection lines, this system cannot be realized.

Moreover, another detection system using an ultrasonic wave had been disclosed in an abandoned U.S. patent application Ser. No. 600,223 filed by one of the inventors on Dec. 8, 1966. This system has a similar construction to the latter of the above-mentioned systems. However, since the sending and receiving transducers are arranged closely in parallel with each other so that the directivity-direction of the transducers are directed in the same direction or intersected to each other at a distance spaced from the transducers, the ultrasonic oscillation is generated in the ultrasonic loop circuit only when the ultrasonic path is completed by reflection or refraction caused by an object or objects intersecting the directivity patterns. Accordingly, this system is convenient to arrange since the transducers can be closely arranged as mentioned above. However, since it is difficult to avoid the direct leakage of the ultrasonic energy from the sending to the receiving transducers, the gain of the amplifier cannot exceed a limited value. Accordingly, the effective range of the system is limited.

As mentioned above, while all objects capable of shielding or reflecting ultrasonic waves are detected in any of the above-mentioned conventional systems, a particular object or particular objects cannot be selected for detection known by the conventional system. Moreover, in case of mutual detection of moving objects, such as vehicles, the conventional systems cannot be applied to perform such detection due to the above-mentioned disadvantage.

An object of this invention is to provide a detection system capable of detecting a particular object or objects.

Another object of this invention is to provide a detection system having a relatively long and large effective range in which an object or objects can be detectable.

Another object of this invention is to provide a detection system capable of detecting an object or objects located at a relatively long distance from a detecting position.

Still another object of this invention is to provide a detection system for vehicles.

A further object of this invention is to provide a detection system readily applicable to burglar alarms.

The principle of this invention and other objects of this invention will be better understood from the following discussion in conjunction with the accompanying drawings, in which the same or equivalent parts are designated by the same reference numerals, characters and symbols, and in which.

Figure 1:
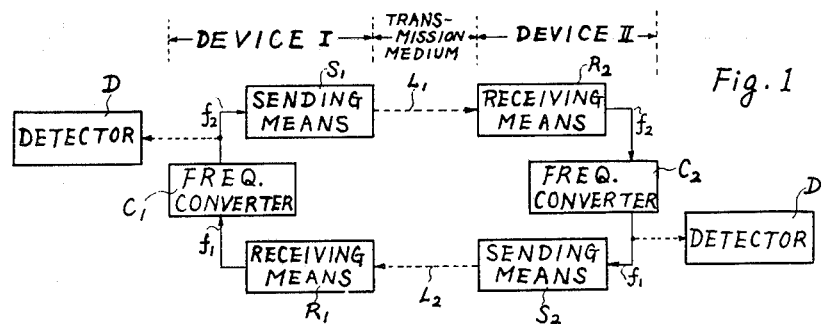
FIG. 1 is a block diagram illustrating an embodiment of this invention.

With reference to FIG. 1, an embodiment of this invention comprises a device I and a device II. The device I comprises a receiving means $R_1$, a frequency converter $C_1$ converting a frequency $f_1$ to a frequency $f_2$, and a sending means $S_1$. The device II comprises a receiving means $R_2$, a frequency converter $C_2$ converting the frequency $f_2$ to the frequency $f_1$, and a sending means $S_2$. Each of the frequency converters $C_1$ and $C_2$ usually comprises an oscillator generating a frequency $(f_1+f_2)$ or $(f_1-f_2)$, a mixer mixing the frequency $f_1$ or $f_2$ received by the receiving means $R_1$ or $R_2$ with the output frequency of the oscillator, and a selection filter selecting the frequency $f_2$ or $f_1$. There is at least one transmission medium of oscillation waves, as shown by references $L_1$ and $L_2$, between the sending means $S_1$ and the receiving means $R_2$ and between the sending means $S_2$ and receiving means $R_1$. In the system of this invention, any oscillation waves can be employed. If ultrasonic waves are employed as the oscillation wave, the receiving means $R_1$ or $R_2$ is an ultrasonic-electric transducer and the sending means $S_1$ or $S_2$ is an electro-ultrasonic transducer. If electromagnetic waves, such as radio waves, are employed as the oscillation waves, the receiving means ($R_1$ or $R_2$) and the sending means ($S_1$ or $S_2$) are respectively a receiving antenna and a transmitting antenna. Moreover, if light waves are employed as the oscillation waves, the receiving means $R_1$ or $R_2$ is a photo-electric transducer and the sending means $S_1$ or $S_2$ is an electro-photo transducer, such as laser elements. In any of the above cases, the input and output signals of the frequency converters $C_1$ and $C_2$ are usually electric signals.

As a result of the above-mentioned construction, the system of this invention has a loop circuit comprising the receiving means $R_1$, the frequency converter $C_1$, the sending means $S_1$, the transmission path $L_1$, the receiving means $R_2$, the frequency converter $C_2$, a sending means $S_2$ and the transmission path $L_2$. Accordingly, if the loop gain of the loop circuit is preset so as to exceed a value "1" at a predetermined condition of the transmission paths $L_1$ and $L_2$, this loop circuit becomes an oscillation condition. Moreover, it can be readily preset so that the oscillation condition is stopper when an object attenuating the oscillation wave intersects any of the transmission paths $L_1$ and $L_2$ or when the length of any of the transmission paths $L_1$ and $L_2$ increases. Accordingly, if a detector D is provided at an appropriate position of the loop circuit (e.g., at the output side of the frequency converter $C_1$ or $C_2$), the change of condition of the loop circuit can be readily detected by the detector D. The detector D is usually a level detector and may be provided at each of the devices I and II.

As understood from the above-mentioned construction of the embodiment of this invention, connection lines are not necessary between the devices I and II. Therefore, one and/or the other of the devices I and II can be mounted on a vehicle or vehicles. The output of the detector can be employed for any application, such as indication of the above-mentioned detection or control of other devices. Moreover, since the receiving means has an active frequency different from that of the sending means, high output power levels may be employed to achieve large effective distances without introducing the problem of leakage from the transmitting means to the receiving means.

Figure 2:
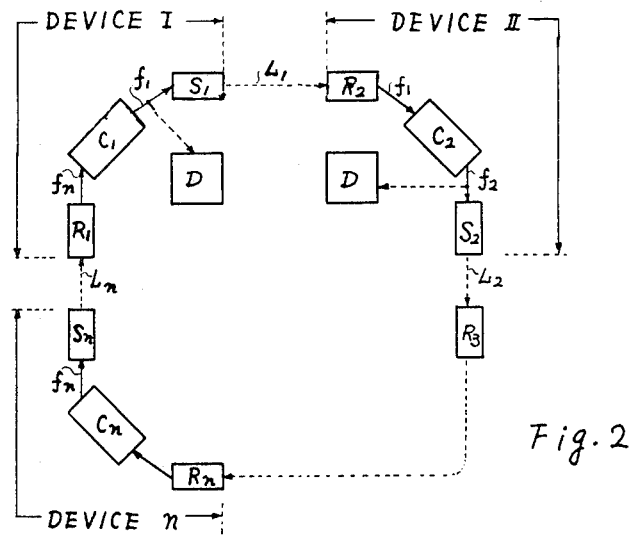
FIG. 2 is a block diagram illustrating another embodiment of this invention.

With reference to FIG. 2, another embodiment of this invention comprises a plurality of devices I, II . . . and $n$, the number of which is more than three. The output of one of the devices I, II . . . and $n$ is applied, through a transmission path $L_1$, $L_2$ . . . or $L_n$, to the input of the next device II . . . $n$, and I, so that a loop circuit of oscillation waves is formed so as to include all the devices I, II . . . and $n$. In this loop circuit, the output frequency of one of the devices I, II . . . and $n$ remains the same after $n$ times frequency conversion. If the loop gain of the loop circuit is preset so as to exceed a value "1" at predetermined conditions of the transmission paths $L_1$, $L_2$ . . . and $L_n$, this loop circuit goes into oscillation when the predetermined conditions occur. Moreover, since this oscillation condition can be stopped, by an appropriate setting of the loop gain, when the loss of any of the oscillation waves increases at any of the transmission mediums $L_1$, $L_2$ . . . and $L_n$, the change of condition caused at any of the transmission paths $L_1$, $L_2$ . . . and $L_n$ or at any of the devices I, II . . . and $n$ can be detected by use of a detector D connected to any of the devices I, II . . . and $n$. This embodiment is suitable to burglar alarms.

The system of this invention has a wide applicable field. An actual example using ultrasonic waves and applied to avoid collisions between automobiles will be described below.

Figure 3:
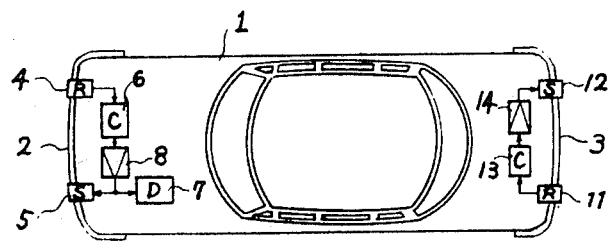
FIGS. 3, 4, 5 and 6 are respectively schematic plan views describing the construction and operation of an embodiment of this invention applied to detect vehicles.
Figure 4:
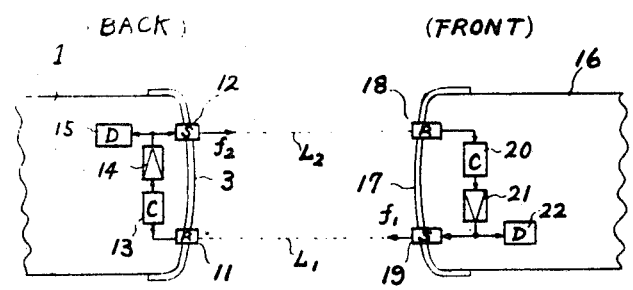

With reference to FIG. 3, an ultrasonic-electric transducer 4, a frequency converter 6, an amplifier 8, an electro-ultrasonic transducer 5 and a detector 7 are provided at the front 2 of an automobile 1. At the back 3 of this automobile 1, there are provided with an ultrasonic-electric transducer 11, a frequency converter 13, an amplifier 14 and an electro-ultrasonic transducer 12. A detector 15 may be provided at this back 3 as shown in FIG. 4. In this example, the transducers 4 and 12 have the same operatable frequency $f_2$, and the transducers 5 and 11 have the same operatable frequency $f_1$. The frequency converter 6 converts the frequency $f_2$ to the frequency $f_1$, and the frequency converter 13 converts the frequency $f_1$ to the frequency $f_2$.

The operation of this example will be described with reference to FIGS. 4, 5 and 6. In FIG. 4, the back 3 of the automobile 1 and the front 17 of another automobile 16 are illustrated. At the front 17 of the automobile 16, there are provided with an ultrasonic-electric transducer 18 having an operatable frequency $f_2$, a frequency converter 20 converting the frequency $f_2$ to the frequency $f_1$, an amplifier 21 of the frequency $f_1$, an electro-ultrasonic transducer 19 having an operatable frequency $f_1$, and a detector 22. If the front 17 of the automobile 16 approaches to the back 3 of the automobile 1 as shown in FIG. 4, a ultrasonic loop circuit is formed through the transducer 12, an transmission path $L_2$, the transducer 18, the frequency converter 20, the amplifier 21, the transducer 19, a transmission path $L_1$, the transducer 11, the frequency converter 13, and the amplifier 14. Accordingly, if the loop gain of the ultrasonic loop circuit is preset so as to exceed a value "1" when the front 17 approaches to the back 3 within a predetermined distance, each of the detectors 15 and 22 detects this approach in response to the start of oscillation in the ultrasonic loop circuit. The detection output of the detector 15 can be employed to indicate "caution" against the succeeding automobile 16 or to indicate "danger of collosion from the back" at the automobile 1. The detection output of the detector 22 can be employed to stop automatically the automobile 16.

Figure 5:
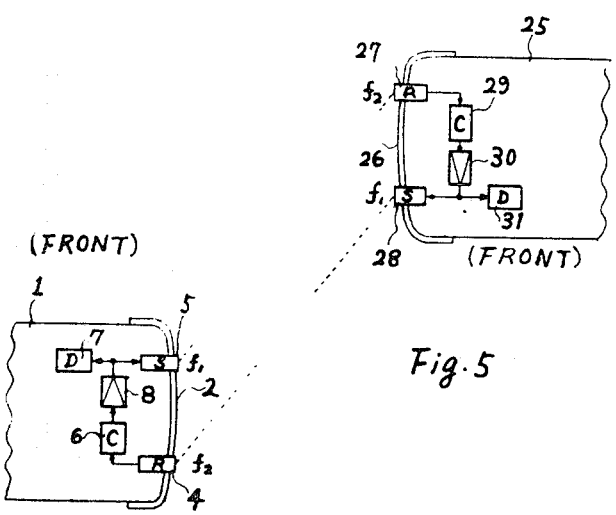

FIG. 5 shows the front 2 of the automobile 1 and the front 26 of another automobile 25 which provides with an ultrasonic-electric transducer 27 having an operatable frequency $f_2$, a frequency converter 29 converting the frequency $f_2$ to a frequency $f_1$, an amplifier 30 of the frequency $f_1$, an electro-ultrasonic transducer 28 having an operatable frequency $f_1$, and a detector 31. In this condition, since each of the transducers 27 and 4 has the operatable frequency $f_2$ different from the operatable frequency $f_1$ of each of the transducers 5 and 28, an active loop circuit cannot be formed even if the fronts 2 and 26 pass each other. Accordingly, oscillations cannot be detected by the detectors 7 and 31.

Figure 6:
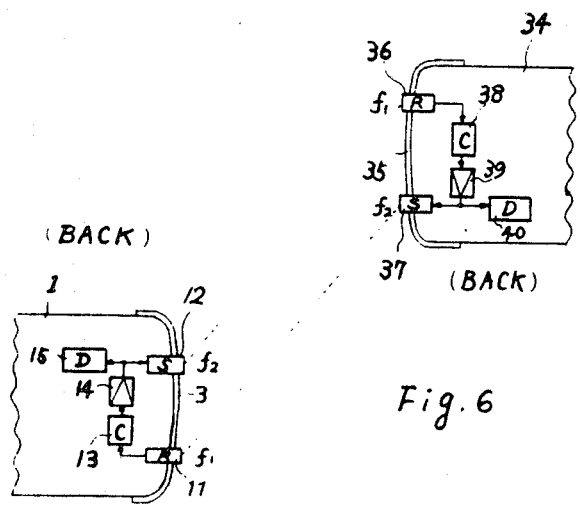

FIG. 6 shows the back 3 of an automobile 1 and the back 35 of another automobile 34, each of which is provided with an ultrasonic-electric transducer 36 having an operatable frequency $f_1$, a frequency converter 38 converting the frequency $f_1$ to a frequency $f_2$, an amplifier 39 of the frequency $f_2$, an electro-ultrasonic transducer 37 having an operatable frequency $f_2$, and a detector 40. Since each of the transducers 36 and 11 has the operatable frequency $f_1$ different from the operatable frequency $f_2$ of each of the transducers 12 and 37, an active loop circuit cannot be formed in this condition even if the backs 3 and 35 pass each other. Accordingly, oscillations cannot be detected by the detectors 15 and 40 in this condition.

As understood from the above description, particular objects can be detected in accordance with this invention in cases where each of the objects is equipped with any of devices I and II. In this case, the approach of an object having the device I is detected by use of the device II. On the contrary, the approach of an object having the device II can be detected by use of the device I. Any of the devices I and II may be mounted on a vehicle.

Moreover, since the receiving means and the sending means have different operatable frequencies from each other in each of the devices of this invention, the device of this invention does not detect any objects not having the devices of this invention.

It is necessary that the directivity of the transducers employed as the receiving and sending means of the embodiment shown in FIGS. 3, 4, 5 and 6 is along the axes of the respective transducers, in the forward directions thereof. Moreover, it is desirable that the directivity is limited to a solid angle of 180°. Since it is easy that the actual transducers have their directivity limited to an angle of +10, the ultrasonic oscillation will not be generated in any of the devices of this invention if two oppositely travelling automobiles each having the device I or II of this invention pass each other. However, if the back and the front of respective automobiles are so exactly positioned as illustrated in FIG. 4, the ultrasonic oscillation will be generated in the loop circuit in consideration of the above-mentioned directivity of the transducers. As mentioned above, this embodiment of this invention is useful for avoiding collisions between automobiles.

Figure 7:
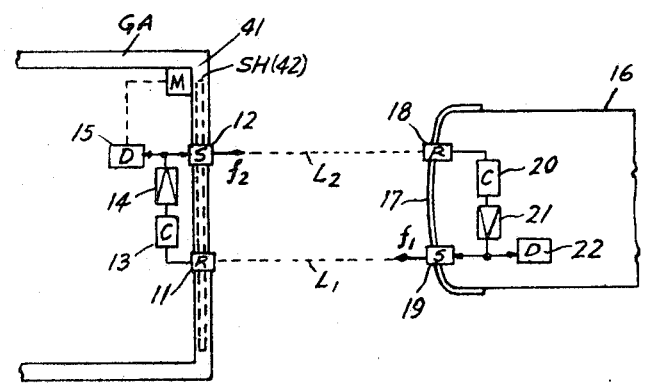
FIG. 7 is a schematic of still another embodiment of apparatus according to the invention.

The detection systems of this invention have many applicable objects other than the above-mentioned objects. By way of example, FIG. 7 illustrates that the automatic opening of a door or doors of a garage can be easily realized by use of the detection system of this invention. In this configuration an automobile is equipped with one of the devices I or II illustrated in FIG. 1 and the other is installed in a garage. The output of detector 15 controls a motor 41 which raises a garage door 42. If the frequency $f_1$ of the trandsucer 19 is equal to that which the ultrasonic transducer 11 is tuned to, the output of the ultrasonic transducer 11, often being converted to frequency $f_2$ by frequency converter 13, amplified by amplifier 14 and detected by detector 15 will activate motor 41 and cause the garage door 42 to open. The frequency selective characteristics of the ultrasonic transducer 11 provides means for discriminating between automobiles. Under the condition where the transducer 19 in the automobile 16 operates at frequency $f_2$ the garage door 42 will not open. The output of transducer 12, when received by the transducer 18 of automobile 16, is converted to frequency $f_1$ by frequency converter 20, amplified by amplifier 21, and detected by detector 22, may be used to activate means, not shown, to warn the driver as the automobile 16 approaches the garage.

What we claim is:

1. A system having a loop circuit for detecting an object or objects in response to a change of condition in the paths of oscillation waves comprising: a first device comprising a first frequency converter for converting without delay a received signal of frequency $f_1$ to a converted signal of frequency $f_2$, a first receiving means comprising an ultrasonic-electric transducer for receiving the received signal, and a second transmitting means comprising an electro-ultrasonic transducer for transmitting the converted signal, said first and second transducers being respectively connected to the input and output of the first frequency converter; and a second device spaced from the first device with a transmission medium therebetween comprising a second frequency converter for converting said converted signal of frequency $f_2$ to a signal of frequency $f_1$, a second receiving means comprising an ultrasonic-electric transducer for receiving the converted signal, and a first transmitting means comprising an electro-ultrasonic transducer for transmitting to the first device the last mentioned signal of frequency $f_1$, said second receiving and first transmitting means being respectively connected to the input and output of the second frequency converter, whereby when a predetermined condition is met at the transmission medium between the first and second devices, a loop circuit formed through the first and second devices and the transmission medium is in an oscillation condition, thereby detecting the object or objects by detecting whether or not the oscillation condition exists in the loop circuit, and wherein one and the other of the first and second devices are respectively mounted at the front and back of an automobile, and in which a detector is provided at each of the devices.

2. A system for detecting an object or objects in response to the change of condition in the paths of oscillation waves comprising:
a plurality $n$, more than three, of devices each comprising a frequency converter, and a receiving means and a sending means respectively connected to the input and output of the frequency converter, said devices being arranged so that a transmission path of each of oscillation waves is formed between adjacent two of the devices so as to form a loop circuit of oscillation waves including the $n$ number of devices and the $n$ number of transmission paths and so that the frequency of one of the oscillation waves becomes again the same frequency, the loop circuit being turned to an oscillation condition when a predetermined condition is met at each of the transmission paths;
whereby the object or objects can be detected by detecting whether or not the oscillation condition exists in the loop circuit.

3. A system for detecting an object or objects in response to a change of condition in the paths of oscillation waves comprising: a device comprising a first frequency converter for converting without time-delay a signal of frequency $f_2$ to a signal of frequency $f_1$, a first receiving means comprising an ultrasonic-electric transducer, and a first transmitter comprising an electro-ultrasonic transducer, said first transducers being respectively connected to the input and output of the first frequency converter; a second device spaced from the first device with a transmission medium therebetween, comprising a second frequency converter for converting without time-delay a signal of frequency $f_1$ to a signal of frequency $f_2$, a second receiving means comprising an ultrasonic-electric transducer, a second transmitter comprising an electro-ultrasonic transducer, said second transducers being respectively connected to the input and output of the second frequency converter, and a detector provided to effect a control operation when the first device approaches the second device, whereby when a predetermined condition is met at the transmission medium between the first and second devices, a loop circuit formed through the first and second devices and the transmission medium is in an oscillation condition, thereby detecting the object or objects by said detector detecting whether the oscillation condition exists in said loop circuit; and a vehicle mounting said first device, and a garage mounting said second device, said garage having a door and mounting said detector, and said control operation comprising control of the door.

References Cited

UNITED STATES PATENTS

| | | | |
|---|---|---|---|
| 2,403,755 | 7/1946 | Rankin | 343—7.5 |
| 2,568,926 | 9/1951 | Moran | 343—7.5 |
| 2,467,299 | 4/1949 | Espenschied | 343—7.5X |
| 3,471,845 | 10/1969 | Sokoloff | 343—5(PD)X |

RICHARD A. FARLEY, Primary Examiner

T. H. TUBBESING, Assistant Examiner

U.S. Cl. X.R.

340—258